(12) United States Patent
Hupperich et al.

(10) Patent No.: US 8,025,252 B2
(45) Date of Patent: Sep. 27, 2011

(54) MODULAR WALL CONSTRUCTION SYSTEM FOR AIRCRAFT CABINS

(75) Inventors: Gerold Hupperich, Dahlem (DE); Klaus Kruber, Bornheim (DE); Oliver Doebertin, Hamburg (DE); Hermann Schotte, Buxtehude (DE)

(73) Assignee: Airbus Deutschland GmbH (DE)

( * ) Notice: Subject to any disclaimer, the term of this patent is extended or adjusted under 35 U.S.C. 154(b) by 0 days.

(21) Appl. No.: 11/632,755

(22) PCT Filed: Jul. 20, 2005

(86) PCT No.: PCT/EP2005/007922
§ 371 (c)(1),
(2), (4) Date: Jul. 31, 2007

(87) PCT Pub. No.: WO2006/008151
PCT Pub. Date: Jan. 26, 2006

(65) Prior Publication Data
US 2007/0295862 A1    Dec. 27, 2007

(30) Foreign Application Priority Data
Jul. 20, 2004  (DE) .......................... 10 2004 035 160

(51) Int. Cl.
*B64D 11/00* (2006.01)
*B64D 13/00* (2006.01)

(52) U.S. Cl. .................... 244/118.5; 52/79.1; 52/238.1; 52/239; 52/270

(58) Field of Classification Search ............... 244/118.5, 244/117 R; 52/79.1, 79.4, 239, 270, 272, 52/238.1, 243.1; 248/220.22, 225.11, 245, 248/411
See application file for complete search history.

(56) References Cited

U.S. PATENT DOCUMENTS

| | | | | |
|---|---|---|---|---|
| 3,294,034 A * | 12/1966 | Bodenheimer et al. | ........... | 410/1 |
| 3,480,239 A * | 11/1969 | Jensen et al. | ..................... | 410/79 |
| 3,661,434 A * | 5/1972 | Alster | ........................... | 312/111 |
| 3,899,092 A * | 8/1975 | Nordstrom | ...................... | 410/87 |
| 3,955,700 A * | 5/1976 | Pedraza | ......................... | 220/1.5 |
| 5,024,398 A * | 6/1991 | Riedinger et al. | ......... | 244/118.5 |
| 5,083,727 A * | 1/1992 | Pompei et al. | ............. | 244/118.6 |
| 5,090,639 A * | 2/1992 | Miller et al. | ............... | 244/118.1 |
| 5,134,826 A * | 8/1992 | La Roche et al. | ............ | 52/584.1 |
| 5,218,803 A * | 6/1993 | Wright | ............................ | 52/243 |
| 5,540,402 A * | 7/1996 | Carducci | .................... | 244/118.1 |
| 5,921,629 A * | 7/1999 | Koch et al. | ................. | 297/344.1 |
| 6,007,025 A * | 12/1999 | Coughren et al. | ......... | 244/118.6 |
| 6,378,825 B1 * | 4/2002 | Yee et al. | ................. | 248/221.11 |
| 6,581,876 B2 * | 6/2003 | Cheung | ....................... | 244/118.5 |
| 2003/0071743 A1 * | 4/2003 | Seah et al. | .................... | 340/945 |

FOREIGN PATENT DOCUMENTS

| | | |
|---|---|---|
| DE | 19520959 A1 | 12/1996 |
| DE | 298 25 000 U1 | 3/2004 |
| FR | 2 810 352 A | 12/2001 |

* cited by examiner

*Primary Examiner* — Tien Dinh
*Assistant Examiner* — Philip J Bonzell
(74) *Attorney, Agent, or Firm* — Lerner, David, Littenberg, Krumholz & Mentlik, LLP

(57) ABSTRACT

The individual room units presently used in aircraft, e.g. crew rest rooms, are usually fixed installations so that quick on-demand changeover of passenger seats to such a room unit may only be feasible with an extended change-over period in the repair hangar. According to an exemplary embodiment of the present invention, a modular wall construction system for aircraft cabins is provided, which comprises individually prefabricated wall construction panels (701, 702, 703) adapted for a quick installation with connecting elements without additional tools. This may result in the formation of at least one room of a room unit (1) of individual size and geometry.

17 Claims, 8 Drawing Sheets

MODULAR WALL CONSTRUCTION SYSTEM FOR AIRCRAFT CABINS

The invention relates to aircraft cabins. In particular the present invention relates to a modular wall construction system for an aircraft cabin.

With an increase in air traffic, airlines are endeavoring to meet the ever growing range of passenger requirements. In particular, the need for the presence of smaller room units, within the actual cabin, for special use has to be met. Such use may be varied, wherein room units may, among other things, meet the following functions: a treatment room for passengers who have fallen ill (circulatory problems during long-haul flights), parent's room, crew rest room, storage of bulky or valuable goods, communication/internet centre, office/workspace, sleeping compartment etc.

In today's commercial aircraft, partition walls that divide the cabin across the longitudinal direction are common; they thus separate the individual passenger classes, first, business and economy. These transverse walls naturally have to adapt to the rib shape towards the fuselage wall if they are to fulfill a partition function. In the middle of the fuselage the partition walls comprise a vertical edge to form a passage. In the upper region, adaptation to the ceiling contour is required. Due to this shape it is obvious that such walls can only serve as cabin partitions but are not suited to the creation of rooms by being joined to each other. Furthermore, attachment of the partition walls not only requires that they be fixed to the floor rails but that there are further attachment points outside on the rib or on the ceiling. In other words, attachment solely by means of the floor rails would not be stable enough or would only be possible using expensive moment-resistant clamping.

The individual rooms presently used in aircraft, e.g. crew rest rooms, are usually fixed installations so that quick on-demand changeover of passenger seats to the above-described room unit would only be feasible with an extended change-over period in the repair hangar. Furthermore, box-like containers within a cabin may be used as children's play areas after side walls have been folded out. However, they may not be suitable to create a room for the types of use mentioned above. A further multi-purpose room with variable interior elements is a usual room module, as is for example used for toilets. In this arrangement the wall parts and the ceiling are fixed, with the multi-purpose use being achieved by variously positionable equipment elements. However, this solution may not provide flexibility in relation to room size or room geometry; moreover, such a room can hardly be installed at short notice between flights.

It may be desirable to provide for a modular wall construction system for aircraft cabins, by means of which within the aircraft cabin self-contained rooms that vary in size and geometry can be created.

According to an exemplary embodiment of the present invention, a modular wall construction system for aircraft cabins may be provided, the modular wall construction system comprising a first individual prefabricated wall construction panel and a second individual prefabricated wall construction panel, wherein the first and the second individual prefabricated wall construction panels are adapted for a quick installation with connecting elements without additional tools, resulting in the formation of at least one room of a room unit of individual size and geometry.

Thus, the change over from passenger seats to a serviceable room may be carried out quickly and without the use of tools. Thus, a wider range of services may be offered to airlines. In this way, depending on customer requirements, various cabin configurations may be created even with the limited time during which the aircraft is on the ground. This may increase the attractiveness and thus the economic efficiency of the airline.

According to another exemplary embodiment of the present invention, the first wall construction panel comprises at least one of a first sidewall segment, a second sidewall segment of the same width as the first sidewall segment, and a corner wall segment, wherein the corner wall segment has an L-shaped horizontal cross section, and wherein the first wall segment is exclusively supported by or attached to a seat rail extending in the cabin floor.

Thus, according to this exemplary embodiment of the present invention, only the floor rails may be used for attaching the wall segments. This may provide for a fast and easy to perform formation of the room unit.

According to another exemplary embodiment of the present invention, the modular wall construction system further comprises a first connecting element, a second connecting element and a third connecting element, each adapted for attaching the first sidewall segment to the second sidewall segment or the corner wall segment, wherein the first and second connecting elements are quick-release fasteners and wherein the third connecting element is a box closing element.

This may provide for an easy connection between the different segments.

According to another exemplary embodiment of the present invention, the first wall segment comprises a first and a second support fitting to the rails, wherein the first fitting comprises a support base and a guiding pin, and wherein a spacing among the first and second support fittings corresponds to a hole spacing of the rails.

This may provide for a quick and flexible installation of the segments to the rails on the floor of the aircraft cabin.

According to another exemplary embodiment of the present invention, the first and second sidewall segments which are installed parallel to the seat rails, or the respective legs of the corner wall segments comprise clamping elements for attachment to the rails, wherein in that position a horizontally slidable lifting pin comprises a clamping plate which during vertical movement of the pin provides for clamping to the rail.

According to another exemplary embodiment of the present invention, the wall construction system further comprises a tongue and groove connection adapted for providing a positive locking of the edges of the wall segments.

This may further improve the stability of the room unit.

According to another exemplary embodiment of the present invention, the first and second wall segments or legs of the corner segments that are installed parallel to the seat rails are positioned outside the rails such that, within the room, the rails are available for further attachment.

According to another exemplary embodiment of the present invention, the room unit comprises an opening without a sealing.

According to another exemplary embodiment of the present invention, the hook-type locking mechanism in the interior of the first and second wall segments comprises a wall recess portion for operation from within the room only.

According to this exemplary embodiment of the present invention, it may only be possible to unlock or lock the wall segments from inside the formed room.

These and other aspects of the present invention will become apparent from and elucidated with reference to the embodiment described hereinafter.

Exemplary embodiments of the present invention will be described in the following, with reference to the following drawings.

The illustration in the drawings is schematically. In different drawings, similar or identical elements may be provided with the same reference numerals.

Figure 1:
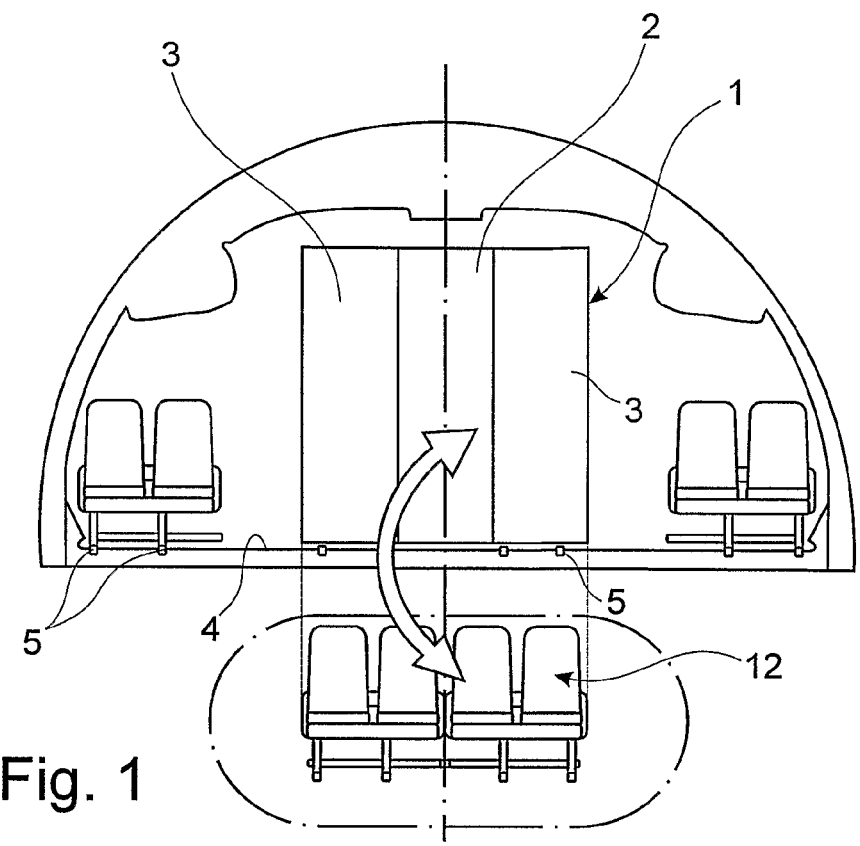
FIG. 1 shows a cabin cross section of a commercial aircraft.

FIG. 1 shows a cabin cross section of a commercial aircraft with a room unit 1 installed in the middle, wherein said room unit 1 comprises the wall segments according to the invention. In this arrangement the room unit 1 comprises sidewall segments 2 and corner wall segments 3. Attachment of the segments is exclusively in the seat rails 5 extending in the cabin floor 4. Due to the intrinsically stable wall design with mutually supporting wall segments 2, 3 it may be sufficient to attach the segments in the seat rails 5. Thus, there may be no need for additional attachment points e.g. on the rib or on the cabin ceiling. Furthermore, the segments may be sufficiently high so that the room unit 1 for reasons of visibility does not require a ceiling, a factor which further favours quick installation. The arrow in the drawing indicates the optional installation of passenger seats 12 instead of the room unit 1.

The individual wall segments 2, 3 may be made in a lightweight design from sandwich panels so that the structure is light in weight, partly also because there is no need for a ceiling structure.

Figure 2:
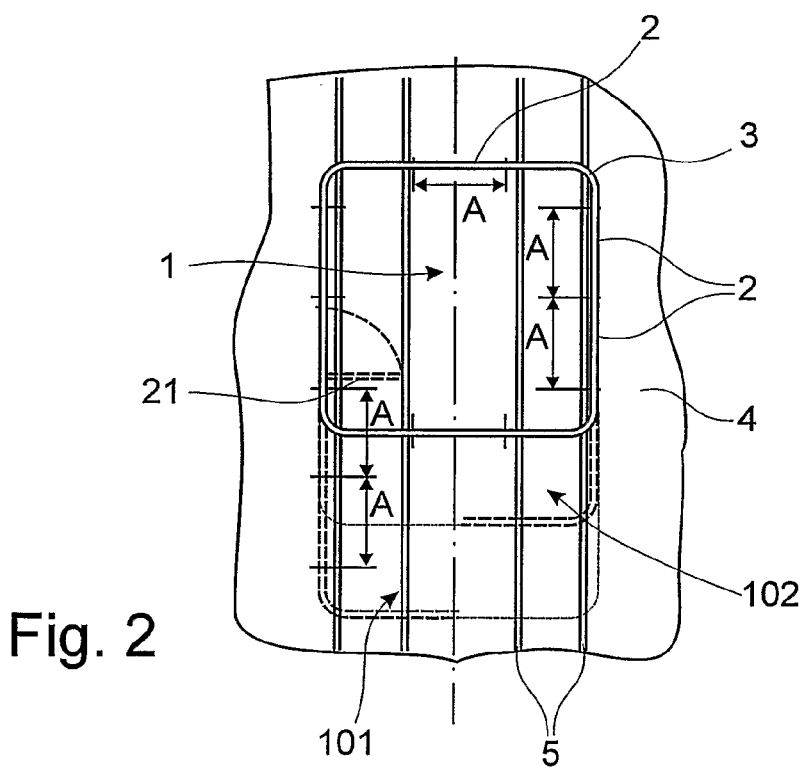
FIG. 2 shows an associated horizontal projection of the cabin of FIG. 1.

In FIG. 2 the horizontal projection associated with FIG. 1 is shown in a bold line, for example with an approximately square shape of the horizontal projection. One sidewall segment 2 comprises a door 21, which may however also be installed in some other position. Shown in dot-dash lines are enlarged room units 101, 102 whose lengths may be varied as required in longitudinal direction of the cabin. Widening in transverse direction may not be suitable due to the presence of aisles on the left and on the right. The drawing also shows that the drawn room unit 1 of almost square shape, in relation to the shape of the horizontal projection, may be modularly expanded by means of the wall segments 2 of the same size (A) to form various rectangular shapes 101, 102, wherein different floor areas result, depending on requirements.

Figure 3:
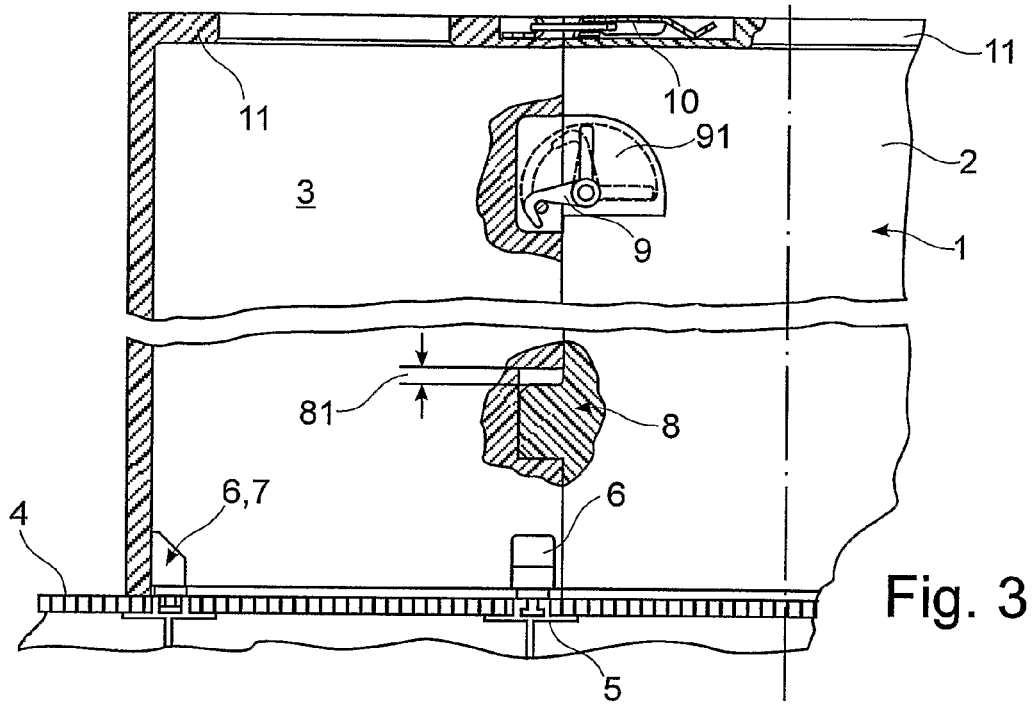
FIG. 3 shows a vertical section of a room unit according to an exemplary embodiment of the present invention.

FIG. 3 shows a vertical section of the room unit 1 seen in longitudinal direction of the aircraft, with a sidewall segment 2 and a corner wall segment 3. Integrated in the floor 4 are the seat rails 5, which the attachment elements 8, 7 engage, wherein support fittings 6 are used for resting the wall segments 2, 3 on the seat rails 5, while clamping elements 7 ensure safe attachment in the rails 5. The drawing also shows the wall connectors 8, 9, 10 which may ensure positive locking and non-positive locking of the edges of the wall segments 2, 3.

Depending on the use of the walls and the type of load on the walls in the room 1, a greater or lesser number of connectors 8, 9, 10 may be provided. A tongue-and-groove connection 8 may ensure that the individual wall segments 2, 3 or 2, 2 are positioned in one plane. For reasons relating to installation, the groove provides vertical play 81. The non-positive locking connection of the wall segments 2, 3 is, according to this exemplary embodiment of the present invention, by way of hook-type elements 9 or/and fastening fittings 10, depending on the type of load. For better stability of the upper edge of the wall, in the diagram the fastening fitting 10 may be embedded in a thick part 11 that goes all around. For reasons of safety and security, it may only be possible to activate the hook-type locking mechanism 9 from inside the room 1. To this effect, the internal wall of the segments 2, 3 may comprise a pocket-like indentation 91 for the operating lever of the hook-type locking mechanism 9. As shown in the drawing, operating the connecting elements 8, 9, 10 does not require any tools so that quick installation by hand is ensured.

Figure 4:
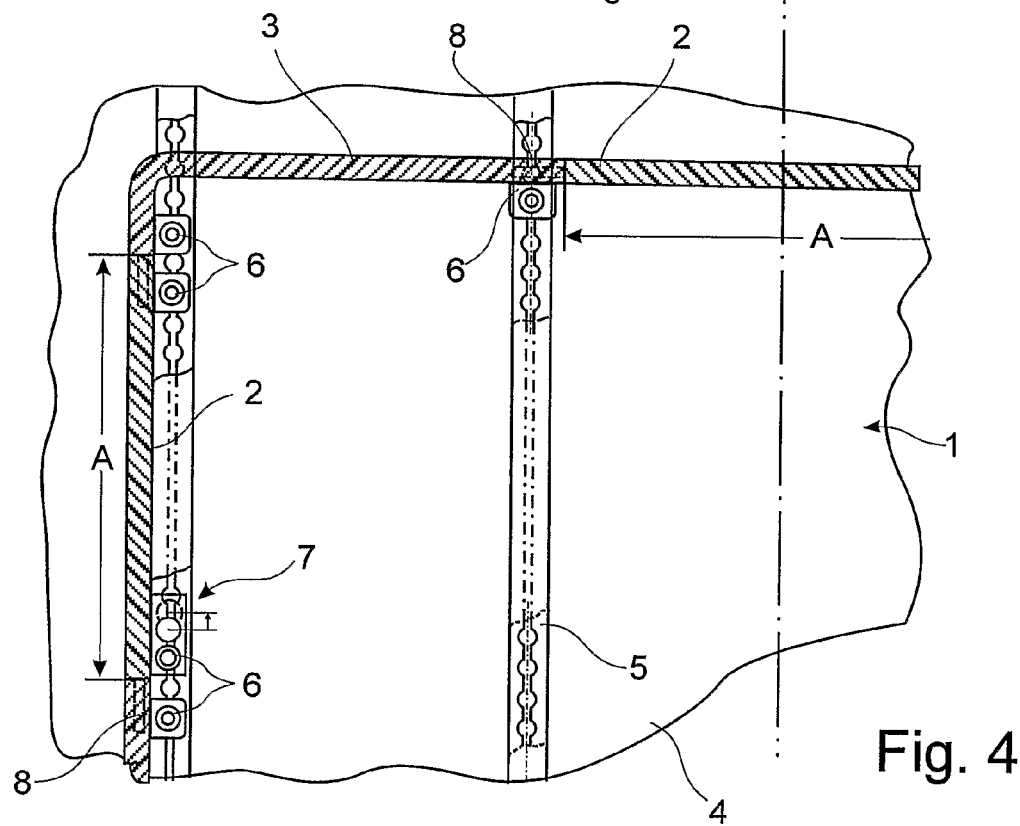
FIG. 4 shows the associated horizontal projection of the room unit of FIG. 3.

FIG. 4 shows the horizontal projection associated with FIG. 3. For example, in this arrangement the corner wall segment 3 comprises two support fittings 6. In a longer limb of the corner segment 3, an additional support fitting 6 may be installed. The drawing shows the wall segments 2 located along the rails 5 with two support fittings 6 and one clamping element 7. The wall segment 2, which is installed across the former, is not connected to the rails 5 so that in this exemplary embodiment of the present invention, the elements 6 and 7 are not installed. Of course the connecting elements 6, 7 may also be selected in a changed arrangement; at any rate a stable structure and fast installation is ensured in this way. The drawing also shows that the spacing among the connecting elements 6, 7 corresponds with the hole spacing of the rails 5. As already mentioned above, the sidewall segments 2, which are installed lengthwise and crosswise, have the same dimensions (A) so that a modular concept of the wall design is achieved. The drawing also shows the characteristic of the longitudinally installed walls 2 not being positioned exactly above the rails 5 but somewhat laterally outside them. This may offer the advantage that also the outer rails 5 extending through the room 1 can be used for attachment purposes.

Figure 5:
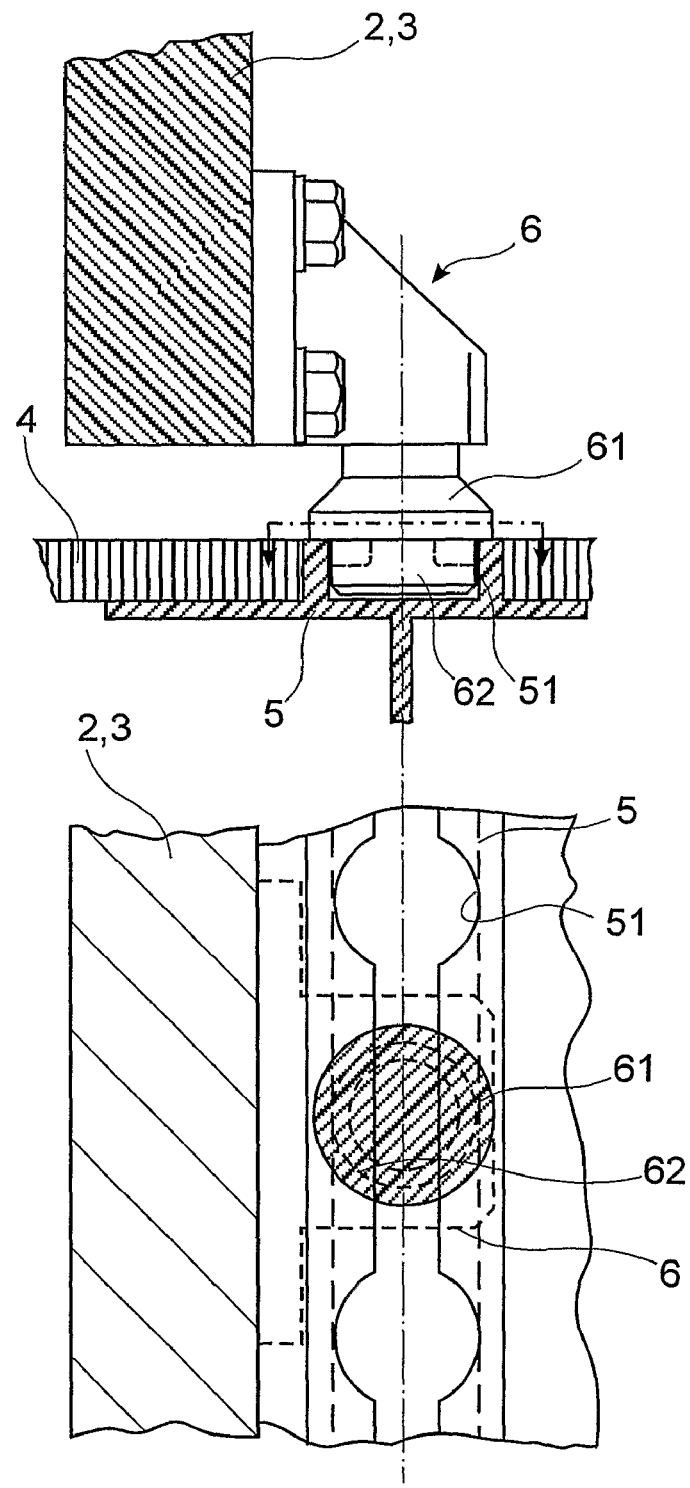
FIG. 5 shows a vertical projection and horizontal projection of a support fitting according to an exemplary embodiment of the present invention.

FIG. 5 shows a vertical and a horizontal projection as well as the function of the support fitting 6 as a connection between the wall 2, 3 and the rail 5. In this arrangement the support base 61 rests against the top of the rail 5 while the guiding pin 62 takes up the space of a rail borehole 51, thus acting as a safety mechanism against displacement in the floor plane 4. The support fitting 6 may, for example, be screwed to the wall 2, 3 or may be attached elsewhere (e.g. pushed from below with dovetail into the wall 2, 3) so as to allow quick de-installation of the fitting if there is a cross wall. During wall installation, the respective wall segment with the support fittings 6 attached to the underside is simply placed into the rail 5, with some play in the guiding pin 62 facilitating installation. Joining the corner wall segment 3 to a sidewall segment 2 already creates a self-supporting structure.

Figure 6:
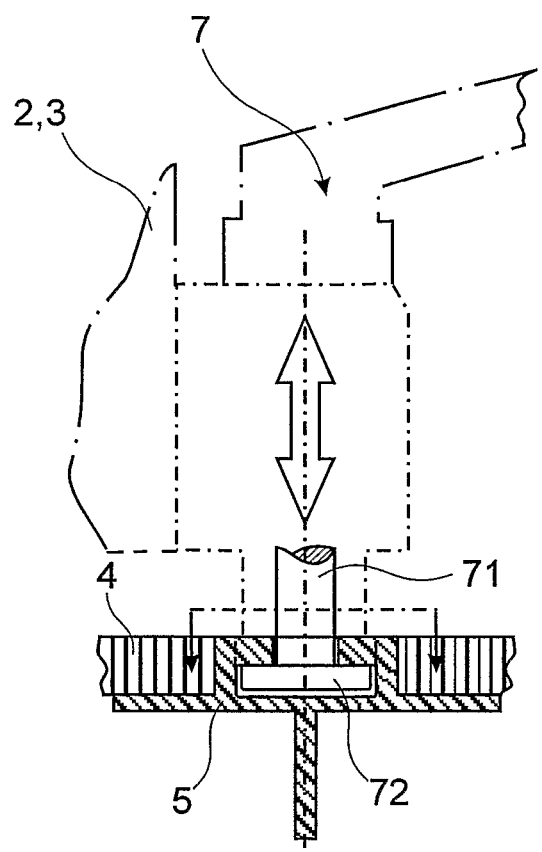
FIG. 6 shows a vertical projection and horizontal projection of parts of a clamping element according to an exemplary embodiment of the present invention.
Figure 6:
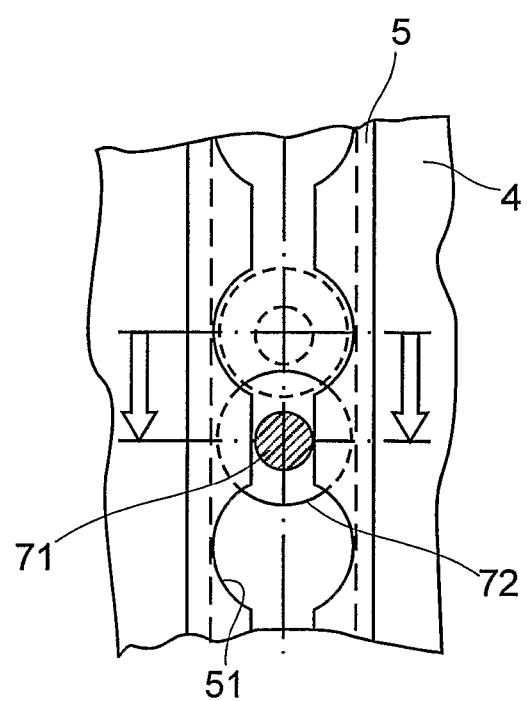

FIG. 6 shows a vertical and a horizontal projection of components of the clamping element 7 with a lifting pin 71 and a clamping plate 72. When the wall segments 2, 3 are erected, first the clamping plate 72 is inserted into a rail borehole 51 (shown in a dot-dash line) and is then moved in the direction of the arrows into a position between two boreholes 51. Here the lifting pin 71 is lifted somewhat, as a result of which the clamping element 7 installed on the wall 2, 3 is clamped or attached to the rail 5. Such attachment is undone in the reverse order. The clamping element 7, which is not shown in detail in the diagram, comprises a simple mechanism for moving the lifting pin 71 horizontally and vertically, with the clamping element 7 being operated by way of a manual lever 73 (e.g. an axially slidable clamp handle).

Figure 7:
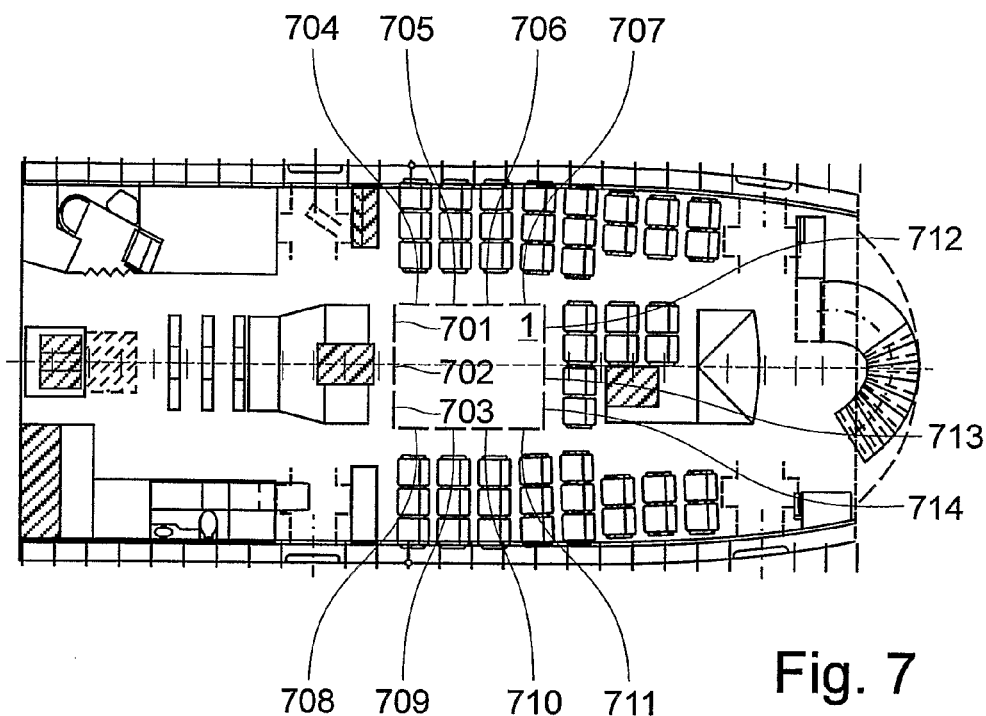
FIG. 7 shows a main deck layout in top view.

FIG. 7 shows a cross section of a main deck layout in top view. The room unit 1 comprises three front elements 701, 702, 703, two times four sidewall elements 704 to 711, and three backside segments 712, 713, 714. One of elements 701-714 may be provided with a door.

The width of each wall segment may be, for example, 635 mm (e.g. corresponding to a distance of two frame members of the aircraft fuselage) and the height may be, for example, 2100 mm. However, it should be noted that the elements may be of different sizes.

Figure 8:
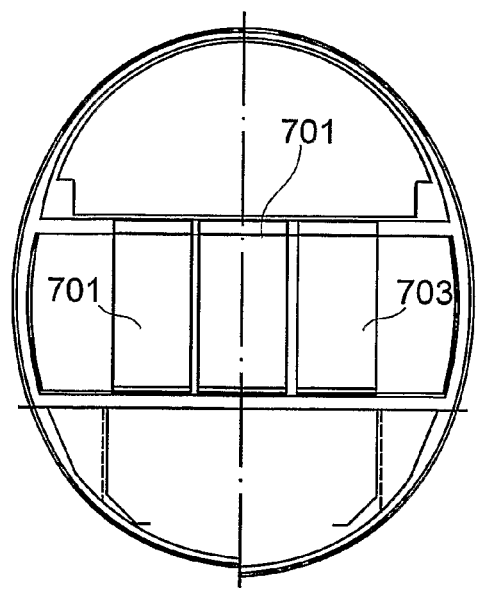
FIG. 8 shows a cross-sectional view of a commercial aircraft body.

FIG. 8 shows a cross section of a commercial aircraft body or fuselage, in which the three front wall segments 701, 702, 703 can be seen.

Figure 9:
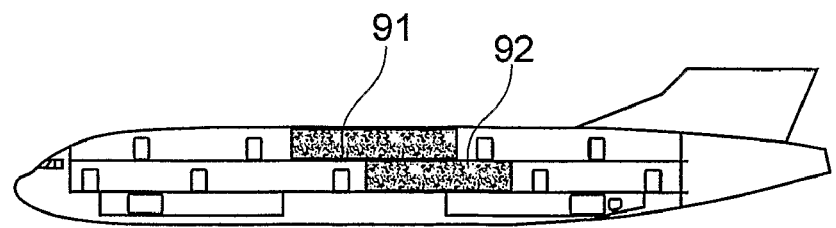
FIG. 9 shows a longitudinal cross section of a commercial aircraft body.

FIG. 9 shows a longitudinal cross section of a commercial aircraft body, depicting possible areas 91, 92, into which a modular wall construction system according to an exemplary embodiment of the present invention may be installed.

A wall construction system according to the present invention, which comprises a plurality of individual wall segments, may be installed in a commercial aircraft adapted for long range flights. Installation may be performed in the center row of the main or the upper deck. According to an aspect of the present invention, the wall construction system may be installed within a minimum amount of time without the use of tools. For attaching the wall construction system to the floor of the aircraft cabin, seat rails may be used. For stability, the individual wall segments may be connected at the upper side by box-closing elements, such as the ones depicted in FIG. 11.

The wall segments according to the invention may be used for forming a room unit which may be used as a medical-compartment, an office for doing business, a crew-room for regeneration or stay of crew members during long range flights, as a storage room for storing baggage, as a family room, a children play room, a room for keeping animals, a sofa lounge, for example for first class passengers, or a wellness room or barber shop.

Assembly of the compartment may be performed on the ground. However, installation may also be performed by crew members during the flight. An exemplary configuration comprises one sidewall segment on each side and one corner wall segment on each corner. One segment may comprise a door.

Figure 10:
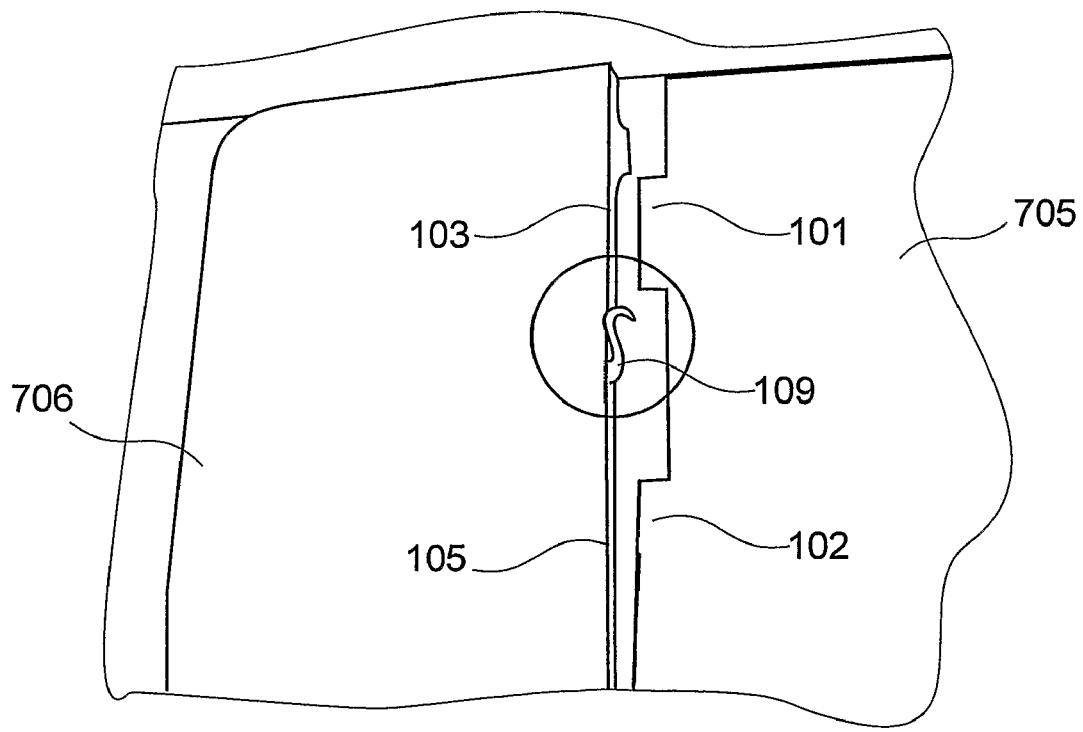
FIG. 10 shows two sidewall segments with a hook-type locking mechanism and a tongue-and-groove connection.

FIG. 10 shows two sidewall segments 705, 706, wherein the first sidewall segment 705 comprises two tongues 101, 102 and wherein the second sidewall segment 706 comprises respective grooves 103, 105 and a hook-type locking mechanism 109 (depicted as reference 9 in FIG. 3). In FIG. 10, the hook 109 is depicted in its opened position. It may be provided with a pivotable axis inside the sidewall segment 706, such that it can be lowered down for closing. When the two elements 705, 706 are engaged, the hook 109 has only to be rotated clockwise in order to lock the two elements 705, 706 together.

Figure 11:
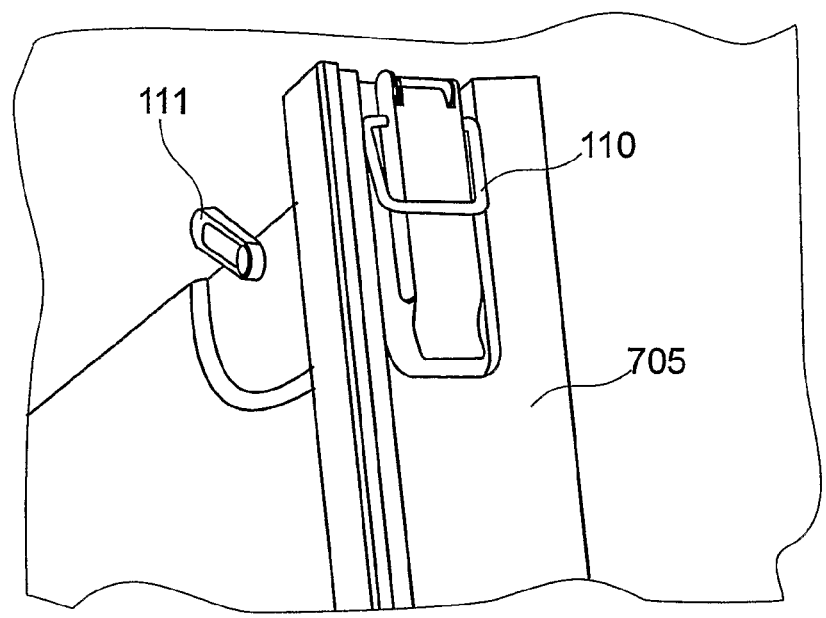
FIG. 11 shows a box-closing element according to an exemplary embodiment of the present invention.

FIG. 11 shows a box-closing element 110, which is arranged in an upper region of the sidewall element 705. The box-closing element 110 is adapted for pulling together two segments at their upper side. Furthermore, the box-closing element 110 is adapted for fixing two segments and therefore provides further stability of the room. Lever 111 is adapted for locking laterally and may be rotated by 180° for bringing the hook 9 (see FIG. 10) from the opened position into the closed position.

Figure 12:
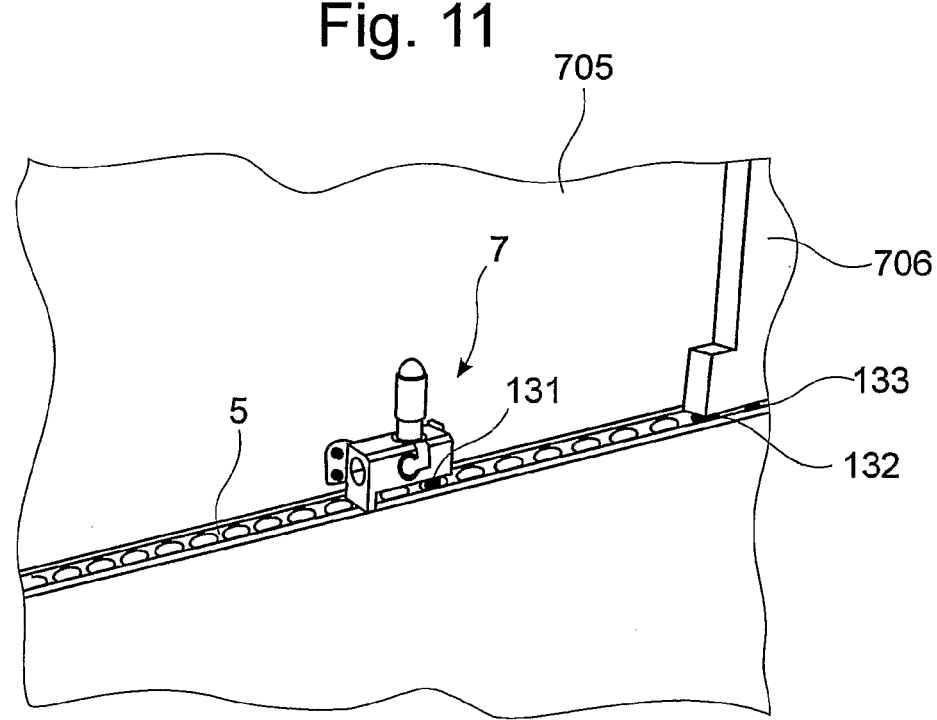
FIG. 12 shows a clamping element for clamping to a rail according to an exemplary embodiment of the present invention.

FIG. 12 shows a clamping element for clamping of the segments 705, 706 to the rail 5. The clamping element 7 comprises a base 131, which is adapted for engaging with an opening of the rail 5. Furthermore, wall segments 705, 706 comprise base elements, such as base elements 132, 133, for engaging with the holes in the rail and thus defining a fixed position.

Figure 13:
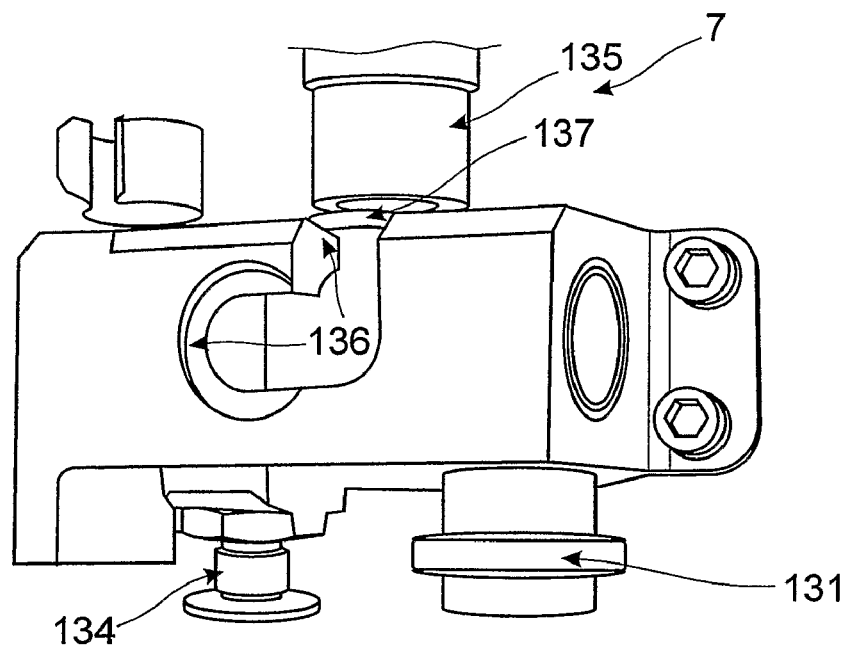
FIG. 13 shows a support fitting according to an exemplary embodiment of the present invention.

FIG. 13 shows a clamping element 7 in a closed position, but outside of a rail 5. The base 131 is adapted for fixing the clamping element 7 to the rail 5 and therefore preventing horizontal movement of the wall segment. The latch 134 is adapted for being clamped to the rail 5, such that a vertical movement of the sidewall may not be possible. Leverage 135 is adapted for opening the clamping element 7 and for interlocking the clamping element 7. The lever 135 is fixed into the position depicted in FIG. 13 by the housing, such that an autonomous opening of the clamping element 7 may not be possible. The fixation may be provided by the wall of the housing, by turning the lever 135 by 90°, and on the other hand by opening 136 into which a washer 137 may be inserted.

Figure 14:
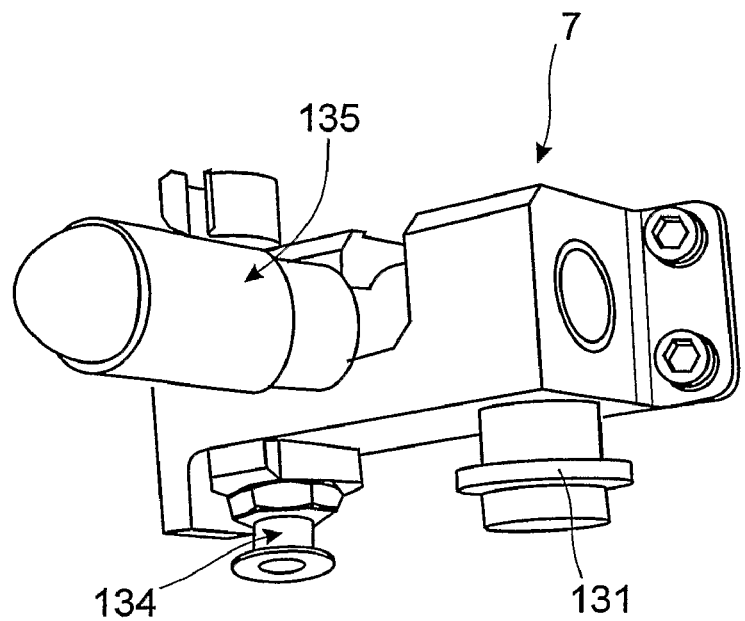
FIG. 14 shows the support fitting of FIG. 13 in its opened position.

FIG. 14 shows the clamping element of FIG. 13 in its opened position. Contrary to the closed position depicted in FIG. 13, here the distance between base 131 and lever 134 has increased. It may thus be possible to insert the clamping element 7 into the rail 5 (or to demount the element 7 from the rail 5). The distance between base 131 and lever 134 is defined by the distance between respective holes in the rail 5. In its opened position, the lever 135 is hold by the opening 136, into which the washer 137 is inserted. This may be necessary for preventing a movement of the lever 135 in order to provide for an easy insertion into the rail 5.

It should be noted that the term "comprising" does not exclude other elements or steps and the "a" or "an" does not exclude a plurality and that a single processor or system may fulfill the functions of several means or units recited in the claims. Also elements described in association with different embodiments may be combined. It should also be noted, that any reference signs in the claims shall not be construed as limiting the scope of claims.

LIST OF REFERENCE NUMBERS

1 Room unit
101, 102 Enlarged room units
2 Sidewall segment
  21 Door
3 Corner wall segment
4 Cabin floor
5 Seat rails
  51 Rail borehole
6 Support fitting
  61 Support base
  62 Guiding pin 7 Clamping element
   71 Lifting pin
   72 Clamping plate
8 Tongue-and-groove connection
   81 Vertical play
9 Hook-type locking mechanism
   91 Wall indentation
10 Fastening fitting
11 Thick part of the wall
12 Passenger seats

The invention claimed is:

1. A modular wall construction system for aircraft cabins, the modular wall construction system comprising:
an individual prefabricated wall construction panel;
wherein the individual prefabricated wall construction panel is adapted for a quick installation with connecting elements without additional tools, resulting in the formation of at least one room of a room unit of individual size and geometry;
wherein the individual prefabricated wall construction panel is adapted to be supported by or attached to a seat rail extending in the cabin floor; and
wherein the individual prefabricated wall construction panel comprises first and second sidewall segments adapted to be installed parallel to the seat rail, the entire first and second sidewall segments, when so installed, being positioned laterally outside the seat rail such that, within the room, the seat rail is available for further attachment,
wherein the first and second sidewall segments which are installed parallel to the seat rail comprise a clamping element for attachment to the rails;
wherein the clamping element comprises a lifting pin horizontally slidable relative to the wall construction panel, the lifting pin having a clamping plate; and
wherein, when in an attached position, the clamping plate effects the clamping to the rail by vertical movement of the pin.

2. The modular wall construction system of claim 1, wherein the room unit has an opening without a ceiling.

3. The module wall construction system of claim 1, wherein the individual prefabricated wall construction panel is exclusively supported by or attached to the seat rail extending in the cabin floor so as to form a self-supporting structure.

4. The modular wall construction system of claim 1, wherein the wall construction panel further comprises a corner wall segment;
the corner wall segment having legs defining an L-shaped horizontal cross-section of the corner wall segment, at least one of the legs positioned at and attached to the seat rail, when the modular wall is in use; and
wherein the first wall segment is exclusively supported by or attached to a seat rail extending in the cabin floor.

5. The modular wall construction system of claim 4, further comprising a first connecting element, a second connecting element and a third connecting element adapted for attaching the first sidewall segment to the second sidewall segment or to the corner wall segment;
wherein the first and second connecting elements are quick-release fasteners; and
wherein the third connecting element is a box closing element.

6. The modular wall construction system of claim 4, wherein the first wall segment comprises a first and a second support fitting to the rails;
wherein the first fitting comprises a support base and a guiding pin; and
wherein a spacing among the first and second support fittings corresponds to a hole spacing of the rails.

7. The modular wall construction system of claim 4, further comprising a tongue-and-groove connection adapted for providing a positive locking of the edges of the first and second wall segments.

8. The modular wall construction system of claim 4, further comprising at least one of a hook-type locking mechanism and a fastening fitting;
wherein a positive connection of edges of the first and second wall segments is provided by the hook-type locking mechanism or the fastening fitting.

9. The modular wall construction system of claim 8, wherein the at least one of a hook-type locking mechanism and a fastening fitting is at least one hook-type locking mechanism; and
wherein the hook-type locking mechanism in the interior of the first and second wall segments comprises a wall recess portion for operation from within the room only.

10. An aircraft having a modular wall construction system, the aircraft comprising:
a cabin having a longitudinal axis;
a first rail aligned along the longitudinal axis of the cabin;
a second rail aligned along the longitudinal axis of the cabin in a position parallel to and offset from the first rail;
a first wall defining a first plane, the first wall having a first attachment mechanism positioned outside of the first plane, the first attachment mechanism adapted to be attached to the first rail such that the first wall plane is other than directly over the first rail; and
a second wall comprising first and second sidewall segments, the second wall defining a second plane, the second wall having a second attachment mechanism positioned outside of the second plane, the second attachment mechanism adapted to be attached to the second rail such that, when in use, the entire first and second sidewall segments are positioned laterally outside of the second rail, the second rail being positioned inside a room formed at least partially by the first and second walls;
wherein the first and second sidewall segments comprise a clamping element for attachment to the second rail; and
wherein the clamping element comprises a lifting pin horizontally slidable relative to the second wall, the lifting pin having a clamping plate; and
wherein, when in an attached position, the clamping plate effects the clamping to the second rail by vertical movement of the pin.

11. The aircraft of claim 10,
wherein the first wall further comprises a corner wall segment, the corner wall segment having legs defining an L-shaped horizontal cross-section of the corner wall segment, at least one of the legs attachable to the seat rail; and
wherein the wall segments are exclusively supported by or attached to the first rail.

12. The aircraft of claim 10, wherein the first wall and second wall are attached to the first rail, and the second rail such that the first rail and second rail are between the first wall and second wall.

13. The aircraft of claim 12, wherein the first rail and second rail are available for further attachment.

14. A modular wall system for an aircraft having a first rail and offset second rail extending along the longitudinal axis of a cabin, the modular wall system comprising:

a first wall comprising first and second sidewall segments, the first wall defining a first plane, the first wall having a first attachment mechanism offset from the first plane, the first attachment mechanism adapted to attach to the first rail such that, when in use, the entire first and second sidewall segments are positioned laterally outside of the first rail;

a second wall defining a second plane, the second wall having a second attachment mechanism offset from the first plane, the second attachment mechanism adapted to attach to the second rail such that the second plane is offset from the second rail;

wherein the first rail is positioned inside a room formed at least partially by the first and second walls;

wherein the first and second sidewall segments comprise a clamping element for attachment to the second rail; and wherein the clamping element comprises a lifting pin horizontally slidable relative to the second wall, the lifting pin having a clamping plate; and wherein, when in an attached position, the clamping plate effects the clamping to the second rail by vertical movement of the pin.

15. The modular wall system of claim 14, wherein the first wall further comprises a corner wall segment, the corner wall segment having legs defining an L-shaped horizontal cross-section of the corner wall segment, at least one of the legs attachable to the seat rail; and wherein the wall segments are exclusively supported by or attached to the first rail.

16. The modular wall system of claim 14, wherein the first wall and second wall are adapted to connect to the first rail and second rail in a manner where the first rail and second rail are between the first wall and the second wall.

17. The modular wall system of claim 16, wherein the first rail and the second rail are available for further attachment within the cabin when the first wall and second wall are connected to the first rail and second rail in a manner where the first rail and second rail are between the first wall and second wall.

* * * * *